United States Patent [19]

Sato

[11] 3,766,321

[45] Oct. 16, 1973

[54] INPUT CIRCUIT FOR AN AUTOMATIC TELEPHONE ANSWERING DEVICE

[76] Inventor: Takashi Sato, No. 14-8 Matsuba-cho, Tokorozawa, Japan

[22] Filed: Feb. 24, 1972

[21] Appl. No.: 228,881

[30] Foreign Application Priority Data

Feb. 27, 1971 Japan ....... 46/11706 (utility model)

[52] U.S. Cl. ................................ 179/6 R, 179/2 A

[51] Int. Cl. ........................................... H04m 1/64

[58] Field of Search .................... 179/6 R, 1 C, 2 C, 179/2 A, 84 R, 84 A, 89

[56] References Cited

UNITED STATES PATENTS

| | | | |
|---|---|---|---|
| 3,445,600 | 5/1969 | Todd | 179/6 R |
| 3,485,952 | 12/1969 | Walker | 179/2 |
| 3,325,598 | 6/1967 | O'Neill | 179/2 |
| 3,492,439 | 1/1970 | Billingsley | 179/84 R |

*Primary Examiner*—Raymond F. Cardillo, Jr.
*Attorney*—Richard C. Sughrue et al.

[57] ABSTRACT

An input circuit for an automatic telephone answering device includes a first series circuit, connected between telephone lines, of a DC current blocking circuit and a connecting circuit, such as a transformer, for receiving signals from telephone lines and transmitting signals from the answering device. A rectifier circuit is connected with the first series circuit in parallel. A second series circuit is connected with the rectifier circuit and consists of a contactless or electronic switching device, such as a transistor, and an AC current blocking circuit. A starting circuit is connected between the telephone lines for switching the switching device to an ON state after receiving an incoming calling signal, thereby making it possible to close the DC loop of the telephone lines through the contactless switching device.

4 Claims, 2 Drawing Figures

INPUT CIRCUIT FOR AN AUTOMATIC TELEPHONE ANSWERING DEVICE

BACKGROUND OF THE INVENTION

This invention relates to an input circuit for an automatic telephone answering device, and more particularly to an input circuit which closes the communication circuit or DC loop of a telephone network upon receiving incoming calling signal, thereby making it possible transmitting and receive message signals.

In the prior art, input circuits for automatic telephone answering devices have been, for example, an input circuit such as illustrated in FIG. 2. Namely, describing the circuit structure of the input circuit with reference to FIG. 2, wherein the reference symbols L1 and L2 represent telephone lines, T represents a matching transformer that the answering device transmits and receives messages through, and C is a coupling condenser. The reference symbol A shows a starting circuit including a timer circuit which starts to operate in 3 to 10 seconds after receiving an incoming calling signal from the telephone lines L1 and L2 in order to energize an after-mentioned relay Y and keeps the relay Y energized during a pre-determined time period (e.g., about 50 to 60 seconds). D1 is a diode which is for preventing a reverse current, Tr1 and Tr2 are transistors comprising a Schmitt trigger circuit, and R1 to R4 are bias resistors, respectively. Y is the relay which, by being energized, switches a contact *y*, and another contact, not shown, to make the answering device operative.

Now describing the operation of the afore-mentioned input circuit, under the condition wherein the calling signal has not come yet, the starting circuit A is in a non-operative state, therefore transistors Tr1 and Tr2 are in the ON and the OFF state respectively, and the relay Y is deenergized. When a calling signal comes through the telephone lines L1 and L2, the calling signal is applied to the starting circuit A via the contact *y* of the relay Y and the condenser C, thereby the starting circuit A becomes operative in about 3 to 10 seconds after receiving the first calling signal. When the starting circuit A becomes operative, the base of the transistor Tr1 falls to the earth potential by way of the diode D1, and thus the transistors Tr1 and Tr2 change to the OFF and the ON state respectively. Consequently, the relay Y is energized through the operating transistor Tr2, the corresponding contact *y* changes to the opposite side from that shown in FIG. 2 to close the communication circuit of the telephone network, and the other corresponding contact, not shown, changes to cause the automatic telephone answering device to become operative. After the answering operation of the automatic telephone answering device terminates, when the timer circuit of the starting circuit A returns to the original state, the automatic telephone answering device returns to the stand-by state to wait for the next calling signal.

This input circuit, however, opens or closes the communicating circuit of the telephone network by switching the contact *y* of the relay Y, therefore it is not to be relied upon due to troubles such as the contact *y* melting and conglutinating, or the engagement of the contact becomes faulty. Further, when the communication circuit of the telephone network is closed by the switching of the contact *y*, a DC current from the telephone lines flows directly into the primary winding of the matching transformer T, therefore there is the disadvantage that a large-sized transformer is necessary for the sake of avoiding the magnetic saturation of the transformer.

SUMMARY OF THE INVENTION

The present invention takes notice of the aforementioned problems.

It is one object of the present invention to provide an input circuit for an automatic telephone answering device in which circuit a starting circuit switches a contactless or electronic switching means such as a transistor to the ON state with the receipt of an incoming calling signal for blocking the DC current loop of the telephone lines, thereby the answering device is made more reliable in an answering operation.

It is another object of the present invention to provide an input circuit for an automatic telephone answering device in which circuit a connecting circuit means such as a transformer, for receiving signals from telephone lines and transmitting signals from the answering device, is connected in series with a DC current blocking circuit for blocking the DC current from the telephone lines, thereby the DC current from the telephone lines does not flow into the connecting circuit means.

Namely, this invention is characterized by a first series circuit, connected between telephone lines, of a DC current blocking circuit means for blocking the DC current from telephone lines, and a connecting circuit means for receiving signals from the telephone lines and transmitting signals from the automatic telephone answering device; a rectifier circuit means connected with the first series circuit in parallel for rectifying incoming signals; a second series circuit, connected with said rectifier circuit means, of a contactless or electronic switching means such as a transistor, and ripple current blocking circuit means for blocking the AC voice signal component; and a starting circuit means, connected between the telephone lines, for switching the electronic switching circuit means to the ON state with the receipt of an incoming calling signal for closing a DC current loop of the telephone lines.

Other objects, features and advantages of the present invention will become more apparent from the following detailed description taken in connection with the accompanying drawings.

DESCRIPTION OF THE PREFERRED EMBODIMENT

Figure 1:
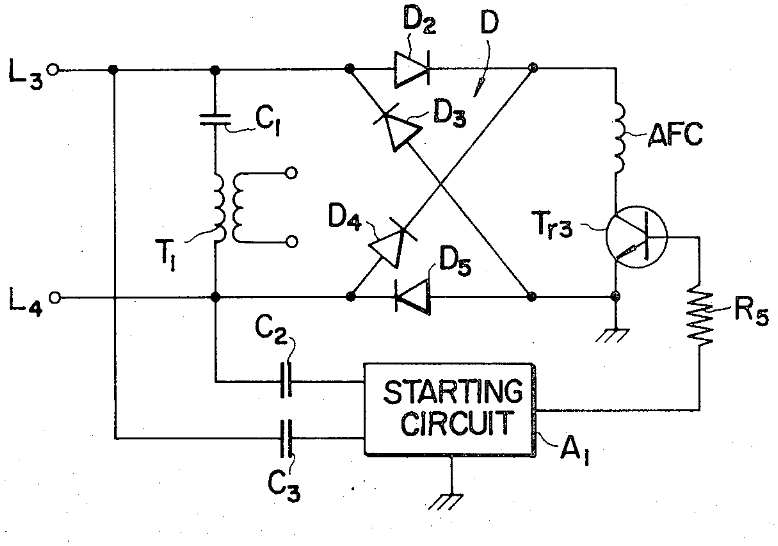
FIG. 1 is a circuit diagram showing one embodiment of an input circuit for an automatic telephone answering device in accordance with the present invention.
Figure 2:
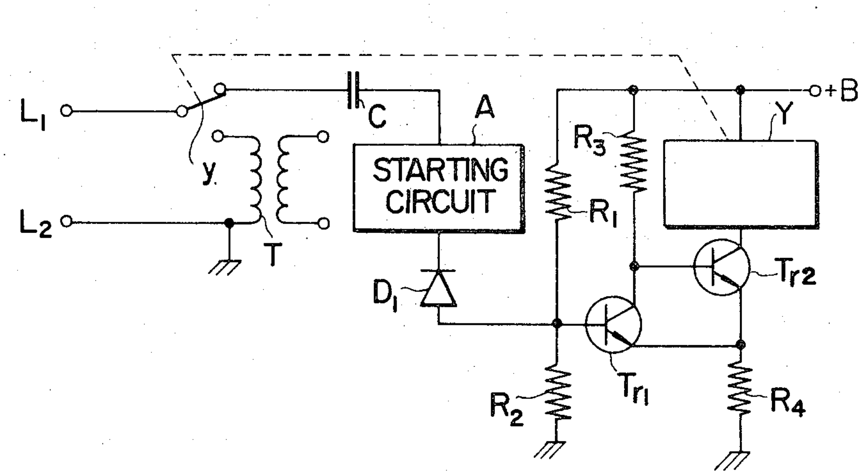
FIG. 2 (PRIOR ART)
FIG. 2 is a circuit diagram of the prior art input circuit for an automatic telephone answering device.

Referring now to FIG. 1 of the drawing, symbols L3 and L4 represent telephone lines, between which the following circuits are connected in parallel: a first series circuit of a condenser for blocking the DC current from the telephone lines L3 and L4 and a primary winding of a matching transformer T1; a rectifier circuit D composed of diodes D2 to D5; and a second series circuit of a choke coil AFC, which presents a high impedance in relation to audio and voice signals and low impedance in relation to a DC current, and the collector and emitter of a transistor Tr3. The emitter of the transistor Tr3 is connected to the earth. Further, a starting circuit A1 (such as shown in Japanese Patent application 45-22366 published in Japan on July 28, 1970) is connected between the telephone lines L3 and L4 through condensers C2 and C3 respectively, and which includes a timer circuit, such as shown in U.S. Pat. No. 3,641,270 for example, which becomes operative in about 3 to 10 seconds after receiving a first calling signal in order to switch the transistor Tr3 to the ON state and keep it operative during a pre-determined time period (e.g., about 50 to 60 seconds).

Now describing the operation of the input circuit comprising the afore-mentioned structural elements, under the condition wherein a calling signal has not come to the input circuit yet, the starting circuit A1 is in the non-operative state, therefore the transistor Tr3 remains in the OFF state. When a calling signal comes through the telephone lines L3 and L4, the calling signal flows into the starting circuit A1 via the condensers C2 and C3. The starting circuit A1 causes the timer circuit to become operative in about 3 to 10 seconds after receiving the first calling signal, thereby an output signal from the starting circuit A1 is applied as a positive voltage to the base electrode of the transistor Tr3 to make it operative through the resistor R5. Consequently, the transistor Tr3 switches to the ON state, and the DC current loop of the telephone lines, that is, the communication circuit of the telephone lines L3 and L4 is closed through the rectifier circuit D, the choke coil AFC being of a low impedance in relation to the DC current from the telephone lines, and the collector and emitter of the transistor Tr3. In addition, the automatic telephone answering device is caused to start to operate by the operation of the timer circuit at the same time when the timer circuit becomes operative.

As a result, the automatic telephone answering device becomes able to transmit and receive messages, and thus, the answering device sends out an outgoing message to the calling party and records an incoming message from him, in the same manner as the operation of the prior art automatic telephone answering device. After the answering device performs the answering operation during a predetermined time period (about 50 to 60 seconds), the timer circuit of the starting circuit A1 terminates its operation, and the transistor Tr3 returns to the OFF state, thereby the DC current loop of the telephone lines L3 and L4, that is, the communication circuit of the telephone network is opened, and the automatic telephone answering device returns to the standby state to wait for next calling signal.

In addition, the starting circuit A1 in the afore-mentioned embodiment sends out the output signal to the transistor Tr3 in about 3 to 10 seconds after receiving the first calling signal, thereby preventing a calling party from being surprised by the automatic telephone answering device answering him at the same time that he finishes dialing. Further, in the embodiment, it is the transistor Tr3 that is switched to the ON state by the output signal of the starting circuit A1 in order to close the communication circuit. This invention should not be, however, limited to this embodiment alone since, other contactless or electronic switching means, like a FET, may be reliable. Furthermore, all that is necessary is that the starting circuit for operating the electronic switching means be so constructed as to detect a calling signal and keep the switching means operative during a desired time period. Furthermore, in the aforementioned embodiment a transformer is used as a connecting circuit means for transmitting and receiving message signals; this connecting circuit means should not be, however, limited to only a transformer.

As was explained in detail hereinbefore, the input circuit, of the present invention, for an automatic telephone answering device is designed so that it includes a contactless or electronic switching means, like a transistor or a FET, that is switched to the ON state by an output signal of a starting circuit in about 3 to 10 seconds after receiving the first calling signal, thereby closing the communication circuit or DC loop of the telephone network. Consequently, it eliminates from the input circuit troubles, such as a contact of a relay melting and conglutinating, or the engagement of a contact becoming faulty, which troubles frequently happen in the prior art input circuit having a relay. Further, the communication circuit of the telephone is not closed through the connecting circuit such as the transformer, and thus the DC current from the telephone lines does not flow into the transformer. Accordingly, it prevents magnetic saturation of the transformer and makes it more reliable in operation.

While the invention has been particularly shown and described with reference to the preferred embodiment thereof, it will be understood by those skilled in the art that various changes in form and details may be made therein without departing from the spirit and scope of the invention.

I claim:

1. An input circuit for an automatic telephone answering device adapted to be coupled to a pair of telephone lines and including starting circuit means responsive to a calling signal on the lines to produce a control signal for initiating operation of the answering device, said circuit comprising:

a. a first series circuit connected between the telephone lines and comprising in series;
   1. DC current blocking circuit means for blocking DC current, and
   2. connecting circuit means for receiving signals from the telephone lines and transmitting signals from an automatic telephone answering device;

b. rectifier circuit means connected to said first series circuit for rectifying incoming signals;

c. a second series circuit connected to said rectifier circuit means and comprising in series:
   1. electronic switching means normally being in a non-conducting state, and
   2. ripple current blocking circuit means for blocking a voice signal current component, and d. means for applying said control signal to said switching means to switch it to a conducting state, thereby closing a DC loop of said telephone lines through said switching means.

2. An input circuit for an automatic telephone answering device as set forth in claim 1 wherein said switching means comprises a normally non-conducting transistor which becomes conducting when it receives the control signal from said starting circuit means.

3. An input circuit for an automatic telephone answering device as set forth in claim 1 wherein said DC current blocking circuit means is a condenser and said ripple current blocking circuit means is a choke coil.

4. An input circuit for an automatic telephone answering device as set forth in claim 3, wherein said connecting circuit means is a matching transformer.

* * * * *